Patented July 5, 1949

2,475,094

UNITED STATES PATENT OFFICE 2,475,094

CUPROUS SALT INHIBITORS FOR FURFURAL COPOLYMERIZATION

John C. Hillyer, Bartlesville, Okla., and Daniel A. Nicewander, Rock Island, Tex., assignors to Phillips Petroleum Company, a corporation of Delaware No Drawing. Application December 20, 1945, Serial No. 636,283

10 Claims. (Cl. 202—39.5)

This invention is a method for inhibiting copolymerization of furfural with conjugated diolefins. In one particular aspect it is a method for preventing copolymerization of furfural with butadiene.

Furfural is widely used in commercial processes wherein a selective solvent for unsaturated compounds is desirable. One of its principal uses as such selective solvent is in the separation of compounds or groups of compounds whose separation by other methods is impractical. Use of the selective solvent power of furfural for unsaturates is made in the refining of rosin, its modifications and derivatives, in the refining of natural drying oils and in the removal of undesirable olefinic and diolefinic constituents from lubricating oils.

Extractive distillation is one important method of employing the selective solvent power of furfural. In this process a substance or substances are selectively absorbed in furfural from a mixture undergoing fractional distillation in a fractionation column. Such absorption of one or more components of the mixture in furfural enables separation of compounds whose volatilities are so nearly identical that separation by ordinary fractionation is not feasible. Thus from $C_4$ hydrocarbon fractions produced by such refinery operations as catalytic or thermal cracking there may be obtained streams of substantially pure normal butenes, butadiene and olefin free n-butane and isobutane streams. Products resulting from the dehydrogenation of n-butenes may be segregated to give essentially complete recovery of 1,3-butadiene in the state of purity required for the manufacture of synthetic rubber and yield a stream of substantially diolefin free butenes for recycling to the dehydrogenation catalyst. Other applications of the selective solvent action of furfural are numerous. Our invention is applicable to these or any other applications where the problem of copolymerization of furfural with conjugated diolefins is encountered.

In the various commercial processes utilizing furfural as selective solvent the furfural is often maintained at elevated temperatures over long periods of time. Furfural is known to darken fairly rapidly when stored at atmospheric temperatures with the concomitant formation of tarry or resinous products. These products are due to polymerization of furfural with itself and are to be distinguished from copolymers formed by polymerization of furfural with conjugated diolefins which are very different from the furfural polymers.

The polymeric material formed from furfural alone is a characteristically dark colored tarry substance. The copolymers formed from furfural with conjugated diolefins differ greatly from this substance in physical appearance. For example the copolymers formed from furfural and butadiene comprise a pale yellow, high boiling oil which distills in the temperature range from 175° F. to 256° F. under 2.0 to 0.5 mm. pressure accompanied by a comparatively small portion of white crystals and by a red viscous liquid which distills at 260° F. to 270° F. under a pressure of 0.5 mm. The formation of resinous materials probably occurs by a further secondary condensation of the primary copolymer since the amount formed increases when heating is prolonged.

In commercial systems the temperature of furfural in contact with conjugated diolefins is often maintained at about 200° to 300° F. or higher thereby promoting the formation of copolymers which accumulate in vital parts of the equipment such as valves, pumps, heat exchangers and the like and seriously interfere with the operation of the process. In extreme cases polymers may accumulate to such an extent as to block transfer lines. High polymer content also reduces the selectivity of the solvent. The polymers present in these systems include those formed from furfural itself and copolymers of furfural with diolefins, with the latter present in larger quantity.

In order to prevent difficulties of operation of such systems and to maintain solvent selectivity at high level it has been necessary to provide facilities for the removal of polymeric materials. Polymer removal has been accomplished by installing means for a periodic distillation of the solvent or means for the continuous distillation of a portion of the circulating stream at such rate as to prevent the polymer concentration in the system from exceeding a certain limit. Methods now in use for purifying furfural used in the recovery of butadiene from $C_4$ hydrocarbon streams are described in detail in the copending application of Hachmuth, Serial No. 460,874, now Patent 2,372,668, and in U. S. Patents to Buell et al. 2,350,584 and to Hachmuth 2,350,609 to which attention is directed for further background. These methods accomplish satisfactory elimination of polymers but at the same time result in appreciable loss in the volume of the solvent. The cost of replacing solvent often becomes a major factor in the total operating cost and may be sufficient to render the process unattractive commercially. While certain operating difficulties may cause losses of furfural it has been found that polymer formation is responsible for the major portion of such loss. Elimination of polymer formation is highly desirable and would constitute a valuable advance in the art.

In commercial systems in which furfural is maintained at elevated temperatures in contact with a conjugated diolefin the rate of copolymer formation is greatly increased. As an example of this sharp increase in rate of polymerization the following table, representing data obtained under typical operating conditions is submitted. The diolefin with which this data was obtained is 1,3-butadiene, chosen because the separation of 1,3-butadiene from $C_4$ hydrocarbon streams is one of the most important commercial applications of the selective solvent action of furfural in extractive distillations. Another application of the use of furfural is found in the extractive distillation of isoprene.

Table

| Time in Hours at 260° F. | Weight Per cent Butadiene | Polymer (Wt. Percent) Formed |
| --- | --- | --- |
| 72 | None | 1.21 |
| 72 | 0.9 | 2.32 |
| 72 | 1.8 | 2.89 |
| 72 | 3.8 | 4.35 |

It is to be noted that the rate of polymerization increases when the concentration of butadiene is increased but the increase in rate of polymerization is not directly proportional to the increase in butadiene concentration. The limiting factors and equilibria of the polymerization reactions are not well understood but it is known that the greater portion of polymers formed are copolymers of furfural and the conjugated diolefin. It is also apparent that in inhibiting this type of polymer formation the reactivity of both furfural and the conjugated diolefin are involved and combine to increase the difficulty in finding effective inhibitors for this type of reaction.

We have now found that the formation of these copolymers of furfural and a conjugated diolefin is inhibited by the presence of small quantities of salts containing copper in the cuprous state. The preferred inhibitors of the present invention include cuprous chloride, cuprous ammonium chloride, cuprous ammonium acetate and cuprous carbonate, but other cuprous salts may also be used.

In the practice of our invention the cuprous salt is added to the furfural by any suitable means. In general it will be convenient to add it to a circulating furfural stream in water solution but any method suitable to the system at hand may be employed. The cuprous salt may be added as a dry powder, as a suspension or slurry in furfural, or as a solution, suspension or slurry in a non-aqueous solvent although it is usually undesirable to add a non-aqueous solvent to the system, because of difficulties caused by foaming or other surface phenomena.

The concentrations employed are in the range from 0.0005 to 0.5 per cent by weight. Upper limits of concentration are in general dependent upon the solubility of the particular cuprous salt used. Since furfural containing only about 5 per cent water is usually used in extractive distillation systems the concentration therein of sparingly soluble salts such as cuprous chloride will necessarily be low.

Cuprous chloride is highly effective as an inhibitor for copolymerizations of furfural with conjugated diolefins when employed in small concentrations. However in higher concentrations release of hydrogen chloride by hydrolysis of the salt may accelerate the polymerization of furfural with itself, and while this reaction proceeds to a lesser extent than the copolymerization of furfural and conjugated diolefin the furfural polymers are equally objectional in the system and such counteraction decreases the beneficial results to be obtained from use of the inhibitor.

Cuprous ammonium salts effectively inhibit the copolymerization and have the advantage of greater solubility, thus making possible the employment of higher concentrations. Thus while cuprous chloride displays limited solubility and it cannot be used except in concentrations below about 0.05 per cent for this reason, cuprous ammonium chloride is readily soluble and may be used up to any desired concentration. Cuprous ammonium acetate is a particularly desirable inhibitor since the presence of the chloride ion is avoided. The stability of this salt and the nature of any hydrolytic products are such as to occasion no increased furfural polymerization. When these salts are used the incorporation of a very small amount of ammonia in the furfural still further increases their stability.

Cuprous carbonate, although entirely insoluble in water, also has effective inhibiting action on the formation of these copolymers. It is possible that this effect may be due to the formation of soluble cuprous salts by reaction of the cuprous carbonate with the small amounts of acids normally found in the furfural circulating in the system.

By the methods of our invention we have been able to obtain a reduction in copolymerization of furfural and a conjugated diolefin amounting to from 25 to 40 per cent when operating with cuprous chloride and cuprous carbonate. With the more soluble cuprous ammonium chloride and cuprous ammonium acetate even higher reductions in copolymerization can be obtained, often exceeding 50 per cent by weight based on the furfural consumed in formation of copolymers.

*Example*

A steel bomb was charged with a mixture of freshly steam distilled new furfural containing 5 per cent water and 5.4 per cent butadiene. To this mixture 0.001 per cent cuprous chloride was added after which the bomb was sealed and maintained at a temperature of 260° F. for 68 hours. The mixture was then transferred to a specially designed distilling flask and stripped of unreacted furfural, water and butadiene under a pressure of 2 to 5 mm. of mercury. The polymer remaining in the flask was weighed and amounted to 2.84 per cent by weight.

The experiment was then repeated using the same reactants but without adding cuprous chloride. After heating under the same conditions as before the separation of the polymer showed a total formation of 4.17 per cent. Comparison with the results obtained with employment of cuprous chloride as an inhibitor showed a reduction of about 30 per cent in polymer formation.

We claim:

1. The process of inhibiting copolymerization of furfural with a conjugated diolefin maintained in contact therewith at elevated temperature which comprises maintaining a salt selected from the group consisting of cuprous chloride, cuprous ammonium chloride, cuprous ammonium acetate and cuprous carbonate in said furfural.

2. The process of claim 1 wherein the proportion of salt in the furfural is between 0.0005 and 0.5 per cent of the weight of the furfural.

3. The process of claim 1 wherein the proportion of salt maintained in the furfural is between 0.0005 per cent of the weight of the furfural and the maximum quantity of salt soluble in said furfural.

4. The process of inhibiting copolymerization of furfural and a conjugated diolefin maintained in contact therewith at elevated temperature which comprises maintaining a cuprous ammonium salt in solution in said furfural.

5. The process of claim 4 wherein the cuprous ammonium salt is maintained in amount between 0.0005 and 0.5 per cent of the weight of the furfural.

6. In a process for the separation of a conjugated diolefin from more saturated organic compounds by extractive distillation using furfural as selective solvent, that improvement which comprises inhibiting copolymerization of furfural with conjugated diolefin by adding a salt selected from the group consisting of cuprous chloride, cuprous ammonium chloride, cuprous ammonium acetate and cuprous carbonate to the furfural used in the process.

7. In a process for the separation of 1,3-butadiene from more saturated C₄ hydrocarbons by extractive distillation using furfural as selective solvent, that improvement which comprises inhibiting copolymerization of furfural with 1,3-butadiene by maintaining a salt selected from the group consisting of cuprous chloride, cuprous ammonium chloride, cuprous ammonium acetate and cuprous carbonate in the furfural used in the process.

8. The process of claim 7 wherein the concentration of cuprous salt in solution is maintained between 0.0005 and 0.5 per cent by weight.

9. In a process wherein furfural and a conjugated diolefin are in contact at elevated temperatures and copolymerization of furfural with this conjugated diolefin is undesirable, that improvement which comprises maintaining a salt selected from the group consisting of cuprous chloride, cuprous ammonium chloride, cuprous ammonium acetate and cuprous carbonate in the furfural used in the process.

10. In a process for the separation of 1,3-butadiene from more saturated C₄ hydrocarbons by extractive distillation using furfural as selective solvent that improvement which comprises inhibiting copolymerization of furfural with 1,3-butadiene by dissolving cuprous ammonium acetate and a small amount of ammonia in the furfural used in the process.

JOHN C. HILLYER.
DANIEL A. NICEWANDER.

REFERENCES CITED

The following references are of record in the file of this patent:

UNITED STATES PATENTS

| Number | Name | Date |
| --- | --- | --- |
| 2,240,764 | Driesbach | May 6, 1941 |
| 2,336,493 | Marks | Dec. 14, 1943 |
| 2,388,041 | Craig | Oct. 30, 1945 |
| 2,407,861 | Wolk | Sept. 17, 1946 |
| 2,409,781 | Mertz | Oct. 22, 1946 |